(No Model.) 2 Sheets—Sheet 1.
L. BELL.
DYNAMO ELECTRIC MACHINE.
No. 522,580. Patented July 10, 1894.
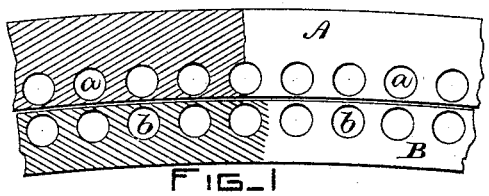
FIG_1_
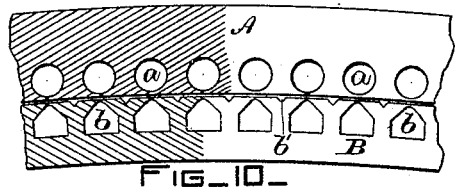
FIG_10_
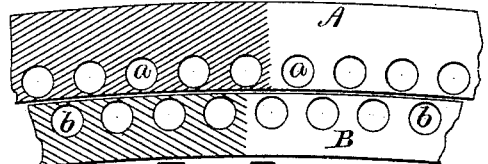
FIG_2_
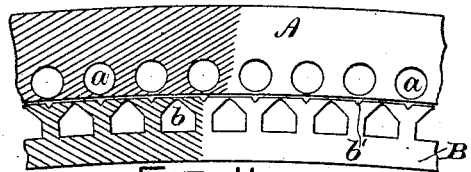
FIG_11_
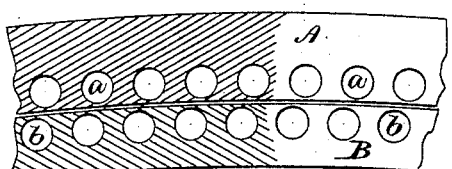
FIG_3_
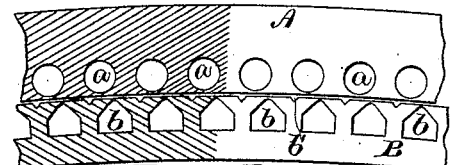
FIG_12_
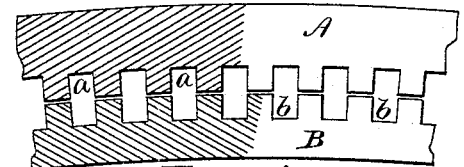
FIG_4_
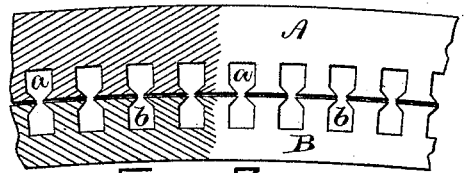
FIG_7_
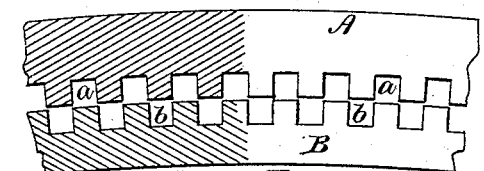
FIG_5_
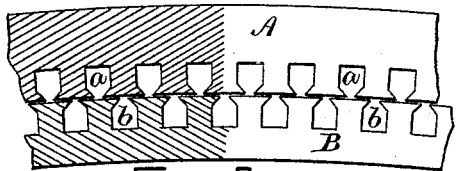
FIG_8_
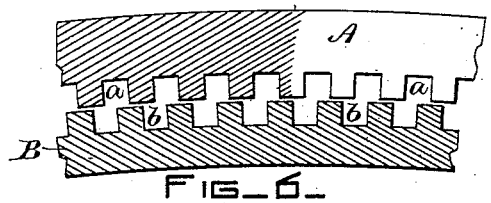
FIG_6_
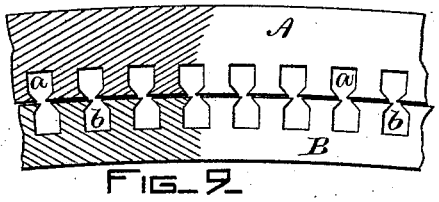
FIG_9_
WITNESSES:
INVENTOR:
Louis Bell
by Bentley & Blodgett.
ATTYS.

(No Model.) 2 Sheets—Sheet 2.
L. BELL.
DYNAMO ELECTRIC MACHINE.
No. 522,580. Patented July 10, 1894.
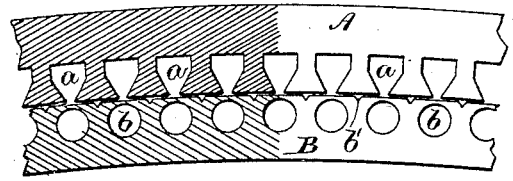
FIG_13_
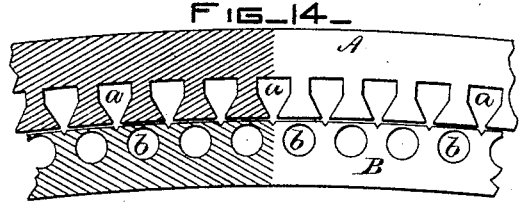
FIG_14_
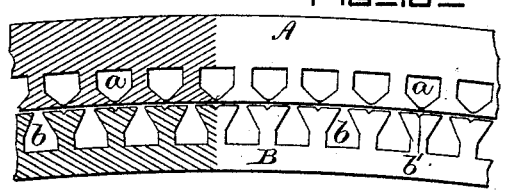
FIG_16_
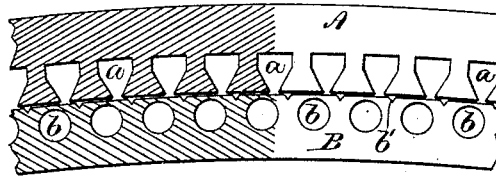
FIG_15_
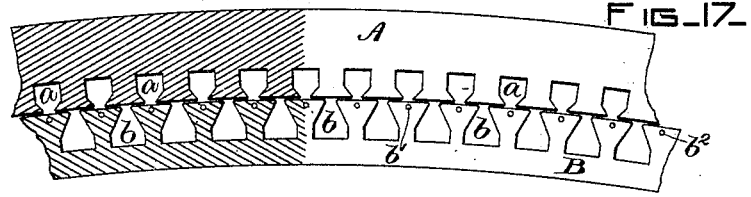
FIG_17_
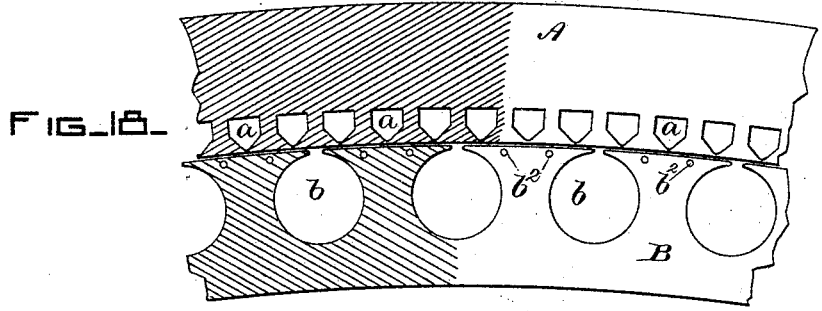
FIG_18_
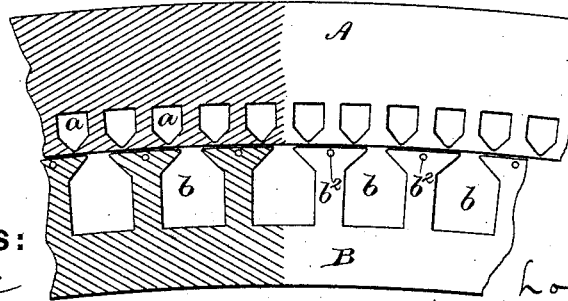
FIG_19
WITNESSES: INVENTOR:

UNITED STATES PATENT OFFICE.

LOUIS BELL, OF LYNN, ASSIGNOR TO THE GENERAL ELECTRIC COMPANY, OF BOSTON, MASSACHUSETTS.

DYNAMO-ELECTRIC MACHINE.

SPECIFICATION forming part of Letters Patent No. 522,580, dated July 10, 1894.

Application filed September 19, 1892. Serial No. 446,244. (No model.)

*To all whom it may concern:*

Be it known that I, LOUIS BELL, a citizen of the United States, residing at Lynn, county of Essex, and State of Massachusetts, have invented a certain new and useful Improvement in Dynamo-Electric Machines, of which the following is a specification.

My invention relates to dynamo electric machines, whether generators or motors, and its object is to provide a path of constant magnetic reluctance for the lines of force flowing between the poles of the field magnet and across the armature in the various relative positions which these parts assume during rotation.

In motors of the alternating or multi-phase type my invention will be found particularly useful for the armature has a tendency to stick on a "dead point," if the teeth on the poles and the armature are the same in number, or multiples of each other, and have the usual cross-section. This is due to the fact that the magnetic reluctance is greater at some positions of the armature than at others, and the armature tends to remain in the position where the lines of force pass most easily. Various devices have been suggested to overcome this tendency. An arrangement of teeth in armature and field corresponding to the limb and scale of vernier, has been suggested, but gives good results only when the number of teeth is considerable. I have found that it is possible to so shape the teeth that they will always afford a path of substantially constant magnetic reluctance, so that there are no "dead points," and the armature is free to move without the sticking tendency referred to no matter what may be the relative position of the teeth in the armature and pole pieces. I gain by this simplicity in construction both in the armature and field, and in the winding. Another advantage is that since there are no fluctuations in the magnetization of the field, wasteful expenditure of energy due to such fluctuations is avoided.

Figure 1 shows a portion of an armature and field magnet of a dynamo or motor provided with teeth and coil cavities or chambers arranged in a manner such as has been heretofore employed. It being understood that one of the two members shown when in operation rotates relatively to the other, the two sets of chambers are continually passing one another, and this figure, together with Figs. 2 and 3, illustrates three of the indefinite number of relative positions which the chambers assume during rotation, Fig. 1 showing the chambers in one member directly opposite corresponding chambers in the second member where the length of the magnetic paths threading the coils is a minimum; Fig. 2 showing chambers in one member in a midway position between adjacent chambers in the other part of the machine, where consequently the magnetic path is longest, and Fig. 3 showing an intermediate position such as would be assumed when the chambers are just departing from or coming into the position of parallelism seen in Fig. 1. Figs. 4, 5 and 6 show the same parts in positions corresponding to those illustrated in Figs. 1, 2 and 3, but the teeth shown are generally square in outline, and the coil chambers are of a like shape, this shape and arrangement also being old in the art. Figs. 7, 8 and 9 are corresponding views differing from the preceding only in the forms given the teeth and coil chambers, the teeth as herein shown having the same general square form as in Fig. 4, but broadened or widened out at the corners so as to leave only a comparatively narrow entrance to the chambers between adjacent teeth. This form is also old. The remaining figures show embodiments of my invention, Figs. 10, 11, and 12 representing one form and arrangement of teeth and coil chambers in the three positions corresponding to those already explained. Figs. 13, 14 and 15 show still another modification, the different figures representing the parts in the same positions as heretofore selected for illustration. Figs. 16 to 19 inclusive, each shows a different modified form and arrangement of teeth and coil chambers carrying out the invention.

In Fig. 1, A, B, represent, respectively, the armature and field magnet of a dynamo or motor, either of which may be the revolving member. In their adjacent faces respectively are formed cavities or chambers *a*, *b*, to receive the coils which, as shown in Fig. 1, are circular perforations with no entering slots, and are the same in number in each member of the machine. Hence, in the position seen in Fig. 1 the coil chambers in the two members come directly opposite one another where, as is evident, the magnetic paths threading the coils are shortest and their magnetic resistance least. But while passing to the position seen in Fig. 2 the magnetic paths have been increasing in length and resistance, from which point a decrease commences and continues until the minimum is again reached. With this arrangement, therefore, the magnetic reluctance for the lines of force is constantly fluctuating, or rising and falling between minimum and maximum amounts, as stated in the opening paragraphs of this specification.

In Figs. 4 to 6 the teeth are rectangular and spaced evenly apart with correspondingly shaped coil chambers between the teeth. In Figs. 7 to 9 the same general form of teeth as shown in Fig. 4 is retained, but the corners of the teeth are widened out or expanded so as to narrow the entrance to the coil chambers, giving the latter a five-sided outline. In both of these last two forms, however, it is evident from inspection of the apparatus in the different positions illustrated, that the magnetic reluctance varies from time to time, as has been explained in detail in describing Figs. 1 to 3. My invention avoids this variation of magnetic resistance or reluctance, and provides substantially equal resistance in all positions of the armature and field magnet, and to this end the shape and arrangement of the teeth are made such as to present always a magnetic path whose length divided by the area of its cross-section is substantially a constant; for the magnetic reluctance increases directly as the length of its path and inversely as its cross-section. Hence, as will be observed, when one of these factors varies under rotation, for example, the length of the path, provision is made for a corresponding and compensating variation in the other factor so that the same ratio is preserved.

Figs. 10 to 12 illustrate in three positions corresponding to those in Figs. 1 to 3, one form of teeth embodying my invention. The chambers in part A are circular, and those in B are pentagonal in outline, there being no entering slots provided. Notches $b'$ are provided in the face of the member B located mid-way between the coil cavities, whose function is to vary during rotation the cross-section factor of the magnetic reluctance so that as the length of the magnetic path increases in passing from the position of Fig. 10 to that of Fig. 11, the increase in the cross section factor maintains the resultant constant.

The construction seen in Figs. 14 and 15 is substantially the reverse of that in the three preceding figures, the circular chambers being now in part B of the machine, and the pentagonal coil chambers in part A but modified so as to leave entrance slots for the winding. Surface notches $b'$ are provided in the face of B, as before, and serve the same purpose.

In Fig. 16 another modification is shown. The teeth are pentagonal with inclined and enlarged outer ends which in the part A entirely meet, but in part B are separated slightly so as to leave slots for receiving the winding. Notches $b'$ are provided mid-way of the outer faces of teeth in part B.

In Fig. 17 the teeth in both parts A and B are pentagonal with broadened ends and separated sufficiently to leave entrance slots for the winding. Instead of surface notches holes $b^2$ of comparatively small diameter are provided in the teeth near their outer faces which serve to vary and render uniform the magnetic resistance in the same manner as already described.

In Figs. 18 and 19 are seen embodiments of the invention where the number of coil chambers in the armature and field of the machine is not the same, the teeth in A being of substantially the same pentagonal shape and arrangement as those described in connection with the preceding figures, but the teeth and chambers in B are much larger and are not so many in number, their outer faces being provided with one or more holes $b^2$, or notches, as may be necessary. The holes and notches heretofore referred to I characterize as channels.

Other forms than those shown may be equally effective and I do not mean to limit my invention necessarily to the specific ones described.

What I claim as new, and desire to secure by Letters Patent, is—

1. A dynamo-electric machine having the adjacent faces of its armature and field-magnet provided with coil chambers, teeth, and channels of such shape and so arranged, substantially as described, that the reluctance of the magnetic path through them in the various relative positions assumed during rotation will be kept substantially constant, as set forth.

2. An alternating current motor having the adjacent faces of its armature and field-magnet poles provided with coil chambers, teeth and channels of such shape and so arranged, substantially as described, that the reluctance of the magnetic path through them is substantially uniform at all positions of the moving part, as set forth.

3. A dynamo-electric machine having the adjacent faces of its armature and field-magnet provided with coil chambers, teeth and channels of such shape and so arranged, substantially as described, that the quotient of the length of the magnetic path through them divided by its cross-sectional area, is substantially constant for all positions of the armature, as set forth.

In witness whereof I have hereto set my hand this 15th day of September, 1892.

LOUIS BELL.

Witnesses:
N. F. HAYES,
E. M. BENTLEY.